United States Patent
Chen

(10) Patent No.: US 9,311,045 B2
(45) Date of Patent: Apr. 12, 2016

(54) ELASTIC BUFFER MODULE AND ELASTIC BUFFERING METHOD FOR TRANSMISSION INTERFACE

(75) Inventor: Chih-Ming Chen, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 349 days.

(21) Appl. No.: 13/597,258

(22) Filed: Aug. 29, 2012

(65) Prior Publication Data

US 2014/0016417 A1 Jan. 16, 2014

(30) Foreign Application Priority Data

Jul. 12, 2012 (TW) .............................. 101125125 A

(51) Int. Cl.
*G11C 7/10* (2006.01)
*G06F 5/14* (2006.01)

(52) U.S. Cl.
CPC ....................................... *G06F 5/14* (2013.01)

(58) Field of Classification Search
USPC ................................................... 365/189.05
See application file for complete search history.

(56) References Cited

U.S. PATENT DOCUMENTS

| | | | | |
|---|---|---|---|---|
| 6,757,348 B1* | 6/2004 | Vila | ........................ | G06F 5/065 370/356 |
| 6,993,690 B1* | 1/2006 | Okamoto | ........... | G11C 16/3418 365/185.33 |
| 7,356,442 B1* | 4/2008 | Astigarraga | .......... | G06F 11/008 702/182 |
| 7,639,548 B1* | 12/2009 | Walker | ................... | G01K 7/425 365/189.09 |
| 8,190,795 B2* | 5/2012 | Hinohara | .............. | G06F 9/5016 710/56 |
| 8,479,080 B1* | 7/2013 | Shalvi | ..................... | G06F 11/10 365/185.09 |
| 2007/0255889 A1* | 11/2007 | Yogev | ................. | G06F 12/0246 711/103 |
| 2008/0294966 A1* | 11/2008 | Kuroishi | ............... | H03M 5/145 714/776 |
| 2009/0154242 A1* | 6/2009 | Janai | ...................... | G11C 29/70 365/185.09 |
| 2009/0248922 A1* | 10/2009 | Hinohara | ............. | G06F 9/5016 710/56 |
| 2011/0197045 A1* | 8/2011 | Okamoto | ........... | G06F 12/0246 711/166 |
| 2012/0033503 A1* | 2/2012 | Kim | ....................... | G11C 16/32 365/185.33 |
| 2012/0268994 A1* | 10/2012 | Nagashima | ......... | G06F 11/1048 365/185.11 |
| 2013/0007543 A1* | 1/2013 | Goss | .................. | G11C 16/3418 714/718 |
| 2014/0101356 A1* | 4/2014 | Sonoda | ............... | G06F 13/4027 710/313 |
| 2014/0122787 A1* | 5/2014 | Shalvi | ..................... | G06F 11/10 711/103 |

FOREIGN PATENT DOCUMENTS

CN 1306358 8/2001

OTHER PUBLICATIONS

"Office Action of China Counterpart Application", issued on Oct. 27, 2015, p. 1-p. 12.

* cited by examiner

*Primary Examiner* — Hoai V Ho
*Assistant Examiner* — Pablo Huerta
(74) *Attorney, Agent, or Firm* — Jianq Chyun IP Office

(57) ABSTRACT

An elastic buffer module including a memory unit, a write control module, and a read control module is provided. The memory unit receives, stores, and outputs a data sequence from a transmitting side. The write control module removes at least part of auxiliary data from the data sequence and writes the data sequence that has the auxiliary data removed into the memory unit. The read control module reads the data sequence from the memory unit and adds auxiliary data to the data sequence to adjust a write state of the transmitting side and a read state of a receiving side. Additionally, an elastic buffering method of a transmission interface is also provided.

25 Claims, 5 Drawing Sheets

ELASTIC BUFFER MODULE AND ELASTIC BUFFERING METHOD FOR TRANSMISSION INTERFACE

CROSS-REFERENCE TO RELATED APPLICATION

This application claims the priority benefit of Taiwan application serial no. 101125125, filed on Jul. 12, 2012. The entirety of the above-mentioned patent application is hereby incorporated by reference herein and made a part of this specification.

BACKGROUND OF THE INVENTION

1. Field of the Invention

The invention generally relates to a buffer module and a data buffering method, and more particularly, to an elastic buffer module of a transmission interface and a data buffering method thereof.

2. Description of Related Art

High-speed transmission interfaces, such as peripheral component interconnect (PCI) express interfaces and universal serial bus (USB) 3.0 interfaces, have been broadly applied for transmitting data among computers and high-performance chips. Such a high-speed transmission interface is usually composed of two low-voltage differential pairs. One of the differential pairs is configured to transmit data, while the other differential pair is configured to receive data. The end close to the processor is usually referred to as an upstream port (UP), while the end away from the processor is usually referred to as a downstream port (DP). The transmitting side of the UP is connected with the receiving side of the DP, and the receiving side of the UP is connected with the transmitting side of the DP.

In order to increase the transmission rate of a conventional parallel interface, a high-speed transmission interface usually adopts the low-voltage differential transmission technique, in which noise interference is eliminated through the differential characteristic, and the voltage level is reduced to increase the transmission rate to the level of gigabyte per second (Gbps)). In addition, a high-speed transmission interface usually has a logic circuit for converting analog signals of the high-speed transmission interface into digital signals compliant with protocols of other layers. Herein the logic circuit at the receiving side needs to deal with the issue of asynchronous timing between the receiving side and the transmitting side of the other port. The asynchronous timing is produced due to the different circuit systems of UP and RX, the spread spectrum clocking (SSC), and the lack of a common clock. A complementary symbol is usually defined as an auxiliary data and used to increase the elasticity in the adjustment of transmission rates. The auxiliary data does not carry any information. When the receiving side is slower than the transmitting side and accordingly the receiving side cannot process data received from the transmitting side in time, the circuit at the receiving side directly removes the auxiliary data from the original data sequence to avoid overflow. Contrarily, when the receiving side is faster than the transmitting side and accordingly the transmitting side cannot provide data to the receiving side in time, the circuit at the receiving side adds the auxiliary data into the original data sequence to avoid underflow.

Conventionally, to resolve the problem of speed difference between a transmitting side and a receiving side, an elastic buffer is usually adopted, and a buffering management circuit is disposed in the elastic buffer to prevent the occurrence of underflow or overflow. However, a conventional data buffering technique usually requires a large buffering space and tolerates a very small speed difference between the transmitting side and the receiving side.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY OF THE INVENTION

Accordingly, the invention is directed to an elastic buffer module, in which a data buffering purpose is accomplished by using a small buffering space, and a large speed difference between a transmitting side and a receiving side is allowed.

The invention is directed to an elastic buffering method of a transmission interface, in which a data buffering purpose is accomplished by using a small buffering space, and a large speed difference between a transmitting side and a receiving side is allowed.

The invention provides an elastic buffer module including a memory unit, a write control module, and a read control module. The memory unit is disposed between a transmitting side and a receiving side. The memory unit receives, stores, and outputs a data sequence from the transmitting side. The write control module is disposed at the transmitting side. The write control module removes at least a part of auxiliary data from the data sequence and writes the data sequence that has the auxiliary data removed into the memory unit. The read control module is disposed at the receiving side. The read control module reads the data sequence from the memory unit and adds auxiliary data to the data sequence to adjust a write state of the transmitting side and a read state of the receiving side.

The invention provides an elastic buffering method of a transmission interface. The transmission interface is configured to transmit a data sequence from a transmitting side to a receiving side. The elastic buffering method includes following steps. The data sequence is received from the transmitting side. At least a part of auxiliary data is removed from the data sequence, and the data sequence that has the auxiliary data removed is written into a memory unit. The data sequence is read from the memory unit. Auxiliary data is added to the data sequence.

As described above, in an elastic buffer module provided by an exemplary embodiment of the invention, part of the auxiliary data in a data sequence is removed before the data sequence is written into a memory unit. Thereby, a data buffering purpose can be accomplished by using a relatively small buffering space in the memory unit, and a large speed difference between a transmitting side and a receiving side is allowed.

These and other exemplary embodiments, features, aspects, and advantages of the invention will be described and become more apparent from the detailed description of exemplary embodiments when read in conjunction with accompanying drawings.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
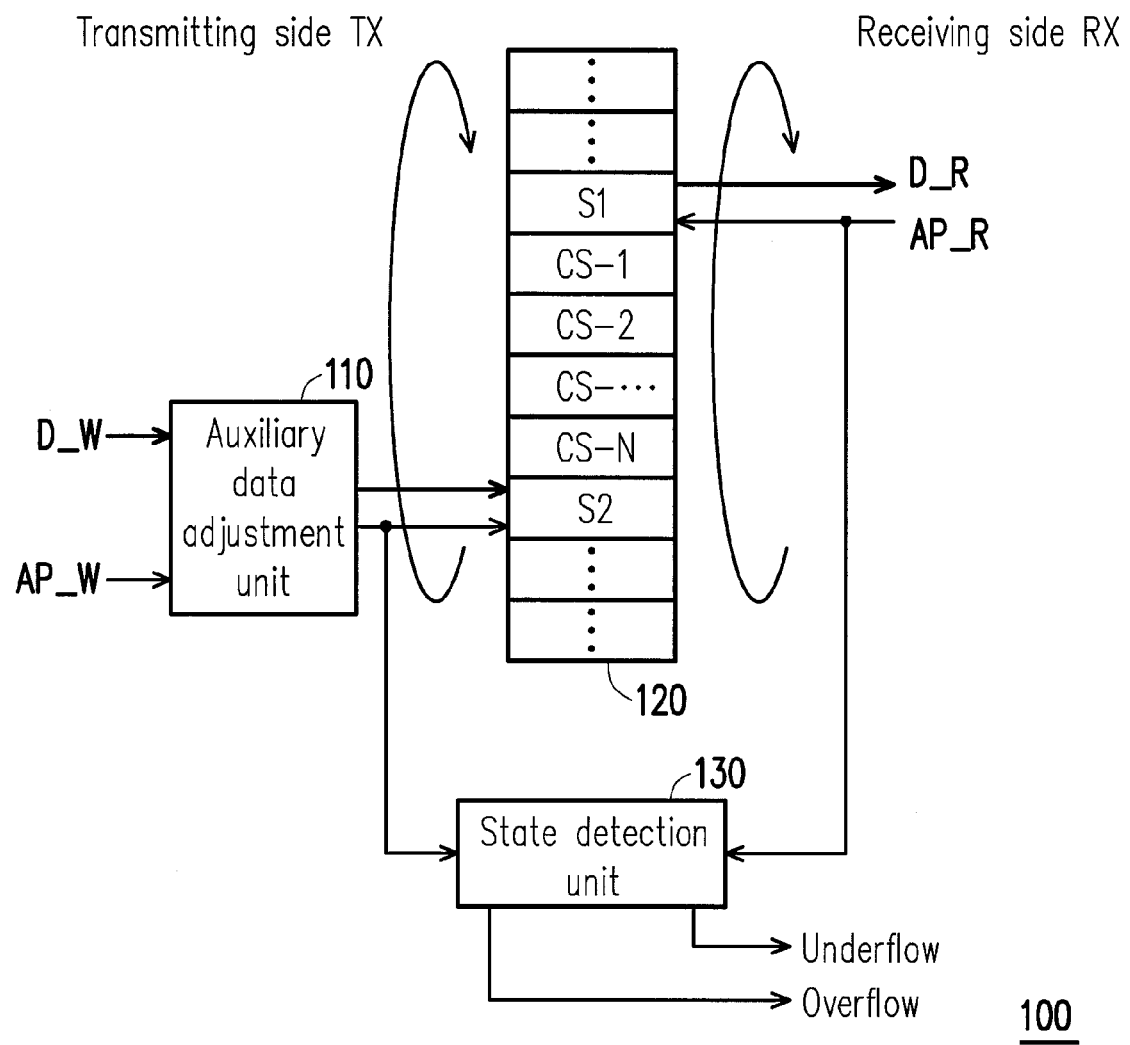
FIG. 1 is a schematic diagram of an elastic buffer module 100 according to a technique related to the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic diagram of an elastic buffer module 100 according to a technique related to the invention. Referring to FIG. 1, in the elastic buffer module 100, an auxiliary data adjustment unit 110 is disposed at a write terminal of an elastic buffer 120 for sequentially writing a data sequence D_W into the elastic buffer 120 according to a write address AP_W. On the other hand, the elastic buffer module 100 further includes a state detection unit 130. The state detection unit 130 monitors the data writing state of a transmitting side TX and the data reading state of a receiving side RX and determines whether the current operation state of the elastic buffer 120 is close to an underflow state or an overflow sate according to the data writing state and the data reading state. Herein the states monitored by the state detection unit 130 may be the data writing speed of the transmitting side TX and the data reading speed of the receiving side RX. The auxiliary data adjustment unit 110 usually removes or adds auxiliary data according to the judgment result of the state detection unit 130, so as to maintain the data writing speed of the transmitting side TX and the data reading speed of the receiving side RX to be within a safe range. As shown in FIG. 1, in the buffer area, the data S1 and the data S2 contain a plurality of auxiliary data CS-1-CS-N. However, this technique can only tolerate a very small speed difference between the transmitting side TX and the receiving side RX and requires a large buffer area. In addition, in the elastic buffer module 100, the auxiliary data adjustment unit 110 may also be disposed at a read terminal of the elastic buffer 120.

Figure 2:
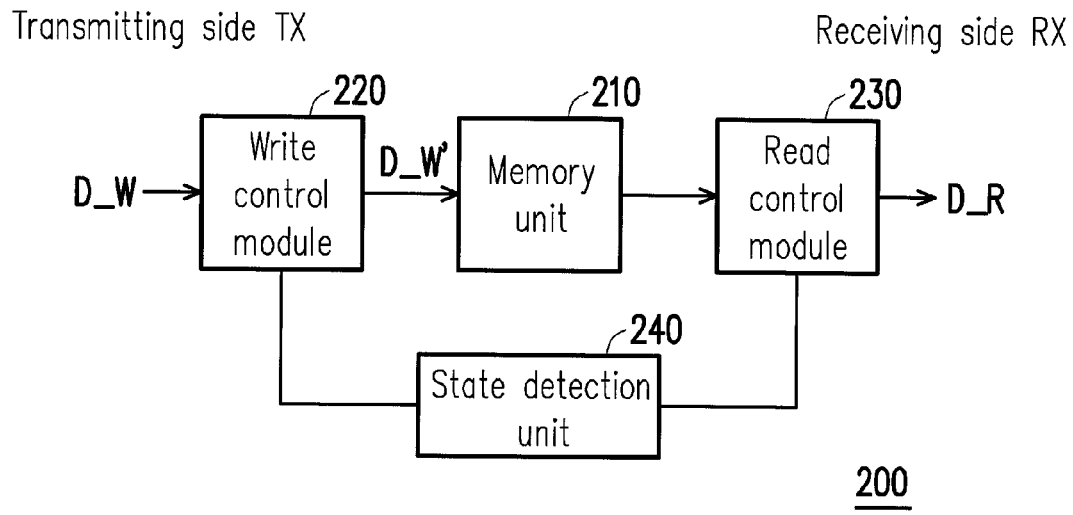
FIG. 2 is a schematic diagram of an elastic buffer module 200 according to an embodiment of the invention.

FIG. 2 is a schematic diagram of an elastic buffer module 200 according to an embodiment of the invention. Referring to FIG. 2, the elastic buffer module 200 in the present embodiment includes a memory unit 210, a write control module 220, a read control module 230, and a state detection unit 240. In the present embodiment, the elastic buffer module 200 is at least suitable for a connector (not shown) in a memory storage device for elastically buffering transmitted data. The connector of the memory storage device complies with the serial advanced technology attachment (SATA) standard. However, the invention is not limited thereto, and the connector may also comply with the Institute of Electrical and Electronic Engineers (IEEE) 1394 standard, the peripheral component interconnect (PCI) express standard, the universal serial bus (USB) standard, the secure digital (SD) interface standard, the memory stick (MS) interface standard, the multi media card (MMC) interface standard, the compact flash (CF) interface standard, the integrated device electronics (IDE) standard, or any other suitable standard.

In the present embodiment, the memory unit 210 is disposed between the transmitting side TX and the receiving side RX. The memory unit 210 includes a plurality of buffer areas. The memory unit 210 is configured to receive, store, and output the data sequence D_W from the transmitting side TX and to buffer data for a transmission interface. The memory unit 210 may be implemented as a first-in-first-out (FIFO) circuit. Thus, the data sequence D_W from the transmitting side TX is stored into the buffer area of the memory unit 210 according to a sequence in which the data sequence D_W is received, so that a corresponding data receiving device (for example, the read control module 230) can read a data sequence D_R according to the same sequence.

In the present embodiment, the write control module 220 is disposed at the transmitting side TX. Generally speaking, the write control module 220 in the present embodiment removes an auxiliary data once it receives the auxiliary data unless the detection result of the state detection unit 240 indicates that the memory unit 210 is in an abnormal state. For example, when a read indicator and a write indicator are too close to each other, the write control module 220 temporarily stops removing any auxiliary data. In an implementation pattern of the operation described above, the write control module 220 removes at least part of the auxiliary data in the data sequence D_W according to information provided by the state detection unit 240 and writes the data sequence D_W' that has the auxiliary data removed into the buffer area of the memory unit 210 according to the write indicator. Besides a complementary symbol, an auxiliary data herein may also be packet data required by the format of the data sequence. In the present embodiment, the data sequence D_W' written into the buffer area includes the data S1, CS-1, and S2 in FIG. 1. Thus, compared to that illustrated in FIG. 1, the write control module 220 in the present embodiment converts the original multiple auxiliary data CS-1 to CS-N into a single auxiliary data CS-1. Namely, the write control module 220 removes or re-edits at least a part of the continuous auxiliary data CS-1 to CS-N and keeps only part of the auxiliary data (for example, the single auxiliary data CS-1) at the write terminal of the memory unit 210. It should be noted that the remaining single auxiliary data is assumed to be the auxiliary data CS-1 in the present embodiment, but the invention is not limited thereto. In other embodiments, the number of remaining auxiliary data is not limited to 1, and the remaining auxiliary data is not limited to the first auxiliary data CS-1. According to the present exemplary embodiment, the required buffering space can be reduced as long as the write control module 220 removes at least one auxiliary data, and the objects and number to be removed are not limited.

In the present embodiment, the read control module 230 is disposed at the receiving side RX. The read control module 230 reads the data sequence D_R from the memory unit 210 and adds auxiliary data to the data sequence D_R according to information provided by the state detection unit 240. The function of the read control module 230 is at least to adjust a write state of the transmitting side TX and a read state of the receiving side RX. In the present embodiment, the read control module 230 adjusts the difference between the data writing speed of the transmitting side TX and the data reading speed of the receiving side RX to be within an acceptable range. In the present exemplary embodiment, the write state may refer to a write speed or a write address, and the read state may refer to a read speed or a read address. However, the invention is not limited thereto.

In the present embodiment, the state detection unit 240 detects whether the memory unit 210 remains in a non-overflow state (i.e., operates properly or in an underflow state) according to the write speed of the transmitting side TX and the read speed of the receiving side RX and outputs a detection result to the write control module 220 and the read control module 230. Additionally, in the present embodiment, an auxiliary data may be a complementary symbol (i.e., a skip symbol in a skip order set defined by a transmission interface standard). The transmission interface standard may be the SATA standard, the PCI express standard, or the USB 3.0 standard. For example, a skip order set defined by the USB 3.0 standard includes two hopping symbols, and each time at least one skip order set needs to be transmitted from the transmitting side TX. The transmitting side TX of a USB 3.0 transmission interface usually transmits 2 to 5 skip order sets. Namely, there are 4 to 10 hopping symbols. On the other hand, a skip order set defined by the PCI express standard includes a starting signal (for example, COM) and two hopping symbols, and each time one skip order set needs to be transmitted from the transmitting side. There are usually 2 to 5 hopping symbols at the transmitting side TX of a PCI express transmission interface.

As described above, in the present exemplary embodiment, multiple auxiliary data are converted into a single auxiliary data. At the write terminal of the memory unit 210, the write control module 220 removes continuous auxiliary data and keeps single auxiliary data. At the read terminal of the memory unit 210, a read control module 230 is disposed for adjusting the difference of transmission rates between the transmitting side TX and the receiving side RX. Because part of the auxiliary data in a data sequence is removed before the data sequence is written into the buffer area, the detection result output by the state detection unit 240 indicates that the memory unit 210 is in an underflow state. Accordingly, the read control module 230 disposed at the read terminal dynamically adds auxiliary data to allow the buffer area to return to a safe state (i.e., to control the difference between the data writing speed of the transmitting side TX and the data reading speed of the receiving side RX to be within an acceptable range). In the present exemplary embodiment, continuous auxiliary data in a data sequence presents at least two implementation patterns, which are uninterrupted continuous auxiliary data (the data sequence may have such a pattern as D0, CS, CS, and D1) and auxiliary data of a fixed interval (the data sequence may have such a pattern as D0, CS, D1, D2, CS, and D3). Herein CS is auxiliary data, and D0 to D3 is the data to be transmitted.

In the technique illustrated in FIG. 1, in order to avoid underflow or overflow, the elastic buffer 120 has to provide sufficient data buffering space to the transmitting side TX and the receiving side RX to deal with the difference of transmission rates without breaching the threshold of buffering space capacity. In the present exemplary embodiment, because the memory unit 210 remains in a non-overflow state through the adjustment of the write state and the read state, the occurrence of overflow may not be taken into consideration in the design of the buffer area. Accordingly, the capacity of the buffer area may be reduced by half. Additionally, in the present exemplary embodiment, because the write control module 220 at the transmitting side TX can remove auxiliary data (which is equivalent to reduce the write speed of the transmitting side TX), the transmitting side TX can have a relatively high operating frequency.

In an exemplary embodiment of the invention, an elastic buffer module may further include an auxiliary judgment unit. The auxiliary judgment unit records the numbers of removed and added auxiliary data during a data buffering procedure, so as to provide the information about whether the total number of auxiliary data increases or decreases.

Figure 3:
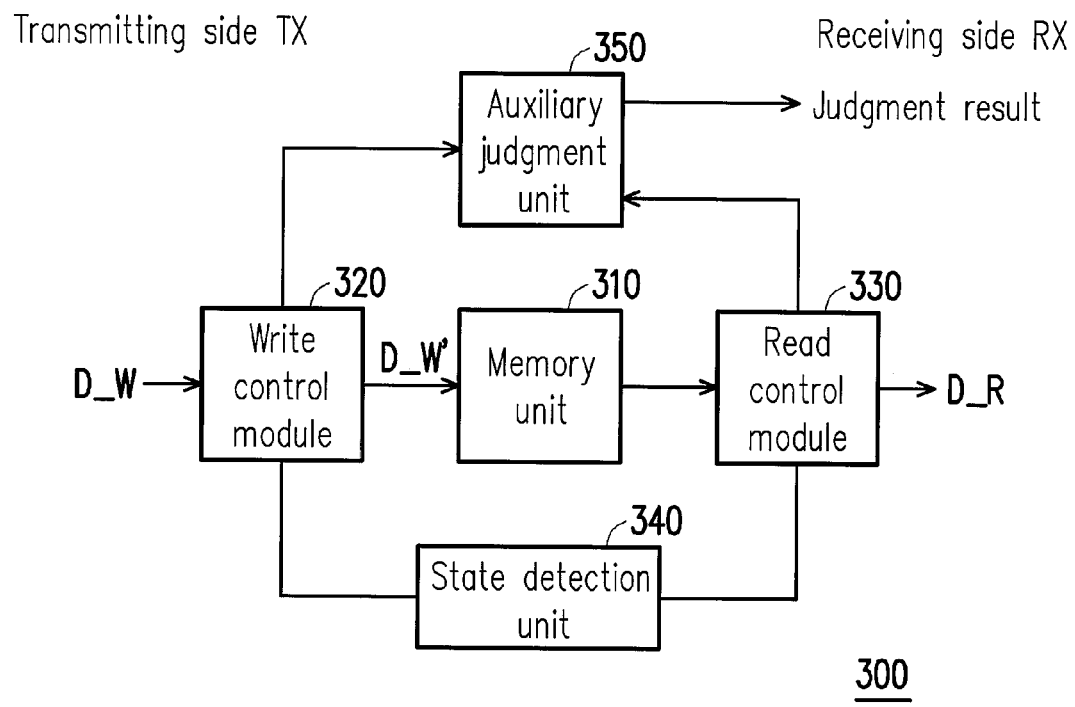
FIG. 3 is a schematic diagram of an elastic buffer module 300 according to another embodiment of the invention.

FIG. 3 is a schematic diagram of an elastic buffer module 300 according to another embodiment of the invention. Referring to FIG. 2 and FIG. 3, the elastic buffer module 300 in the present embodiment is similar to the elastic buffer module 200 in FIG. 2, and the difference between the two elastic buffer modules is that the elastic buffer module 300 further includes an auxiliary judgment unit 350. Below, the auxiliary judgment unit 350 will be explained in detail.

In the present embodiment, the write control module 320 removes auxiliary data from the data sequence D_W according to the detection result (for example, indicating that the memory unit 310 is in an underflow state or close to an overflow state) of the state detection unit 340. The read control module 330 adds auxiliary data to the data sequence D_R also according to the detection result of the state detection unit 340. To determine whether in general the auxiliary data in the data sequence D_R output by the read control module 330 is added or removed compared to the data sequence D_W, the auxiliary judgment unit 350 records the number of removed auxiliary data and the number of added auxiliary data, determines whether in general the auxiliary data is added or removed according to these two numbers, and outputs a judgment result to a controller disposed at the receiving side, so that the controller can perform error detection according to the judgment result. The controller may be a memory controller (not shown) of a memory storage device.

Figure 4:
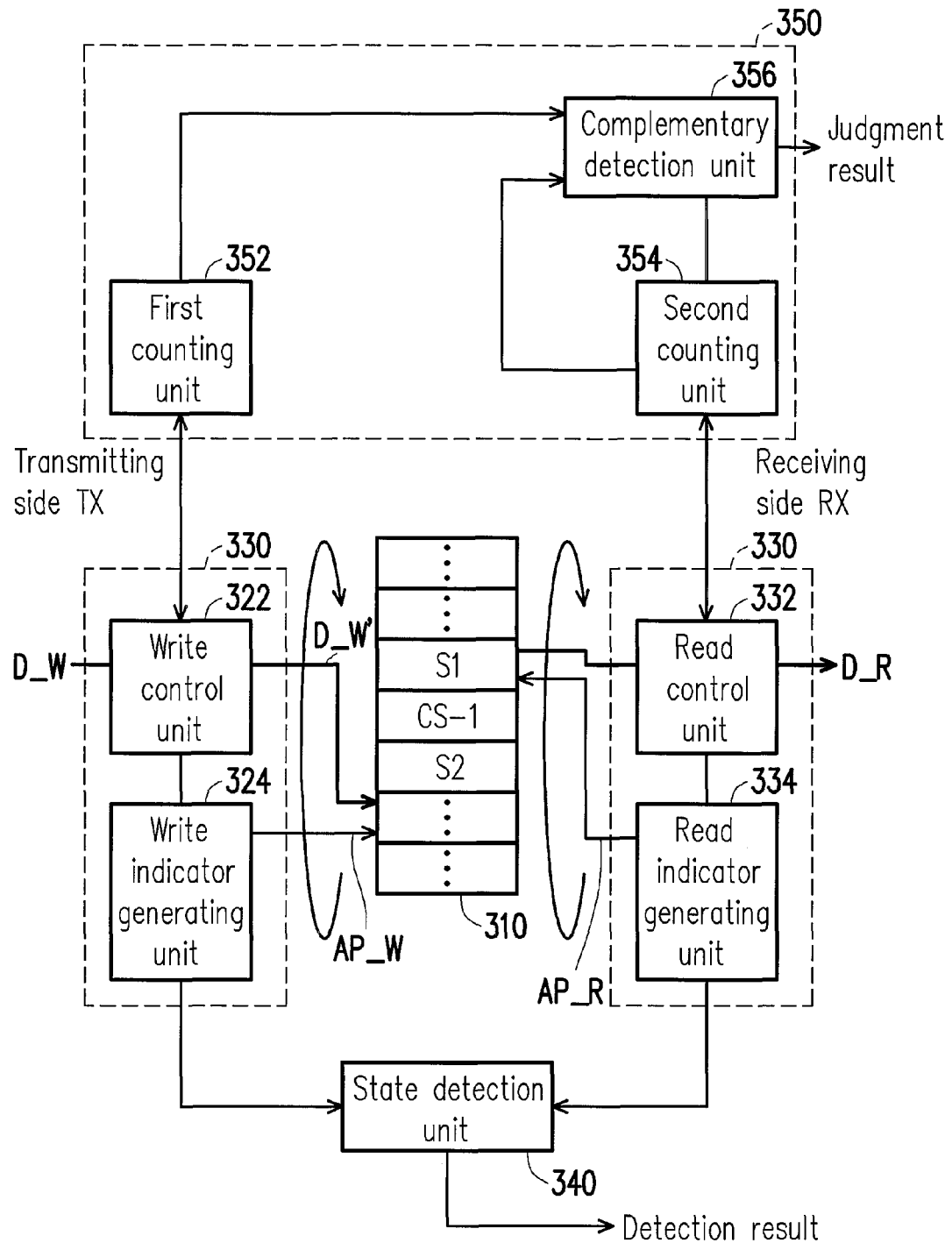
FIG. 4 is a schematic diagram of the elastic buffer module 300 in FIG. 3.

FIG. 4 is a schematic diagram of the elastic buffer module 300 in FIG. 3. Referring to FIG. 4, the write control module 320 in the present embodiment includes a write control unit 322 and a write indicator generating unit 324. The write control unit 322 receives the data sequence D_W. Herein the data sequence D_W may include auxiliary data CS-1 to CS-N. The write control unit 322 removes part of the auxiliary data in the data sequence D_W according to the detection result of the state detection unit 340. Then, the write control unit 322 writes the data sequence D_W' that has the auxiliary data removed into the buffer area of the memory unit 310 according to a write indicator AP_W. In the present embodiment, the data sequence D_W' with the auxiliary data removed may include data S1, CS-1, and S2. Namely, the write control unit 322 removes the continuous auxiliary data CS-1 to CS-N and keeps only the single auxiliary data CS-1 to take up less buffering space. The write indicator generating unit 324 generates the write indicator AP_W. The write indicator AP_W indicates the address in the memory unit 310 to which the data sequence D_W' is written.

In the present embodiment, the read control module 330 includes a read control unit 332 and a read indicator generating unit 334. The read control unit 332 reads a data sequence (for example, data S1, CS-1, and S2) from the buffer area of the memory unit 310 according to a read indicator AP_R and the FIFO rule. Besides, the read control unit 332 adds auxiliary data to the data sequence D_R according to the detection result of the state detection unit 340. The read indicator generating unit 334 generates the read indicator AP_R. The read indicator AP_R indicates the address in the memory unit 310 to which the data sequence is stored.

In the present embodiment, the auxiliary judgment unit 350 includes a first counting unit 352, a second counting unit 354, and a complementary detection unit 356. The first counting unit 352 is coupled to the write control unit 322 and configured to count the number of removed auxiliary data. The second counting unit 354 is coupled to the read control unit 332 and configured to count the number of added auxiliary data. The complementary detection unit 356 determines whether in general the auxiliary data in the data sequence D_R output by the read control unit 332 is added or removed compared to the data sequence D_W according to the number of the removed auxiliary data and the number of added auxiliary data, and the complementary detection unit 356 outputs a detection result to a controller disposed at the receiving side RX.

Figure 5:
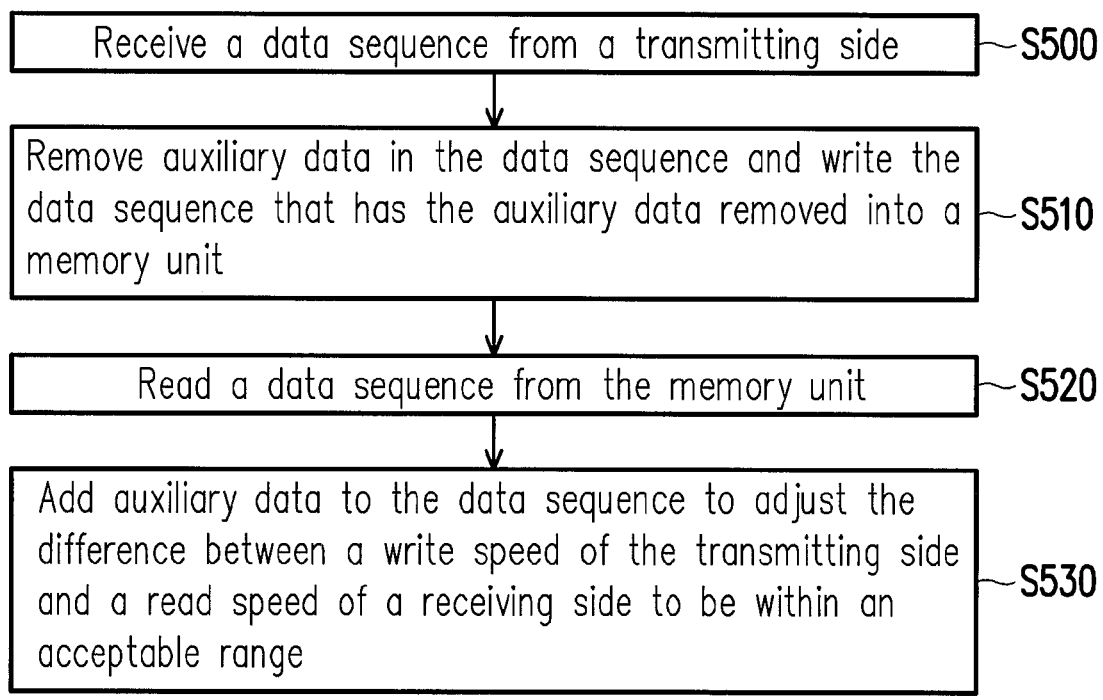
FIG. 5 is a flowchart of an elastic buffering method of a transmission interface according to an embodiment of the invention.

FIG. 5 is a flowchart of an elastic buffering method of a transmission interface according to an embodiment of the invention. Referring to both FIG. 2 and FIG. 5, the elastic buffering method in the present embodiment may be adapted to an elastic buffer module described in any one of foregoing exemplary embodiments and includes following steps. In step S500, the elastic buffer module 200 receives a data sequence D_W from the transmitting side TX. Then, in step S510, the elastic buffer module 200 removes at least part of auxiliary data in the data sequence D_W and writes a data sequence D_W' that has the auxiliary data removed into the memory unit 210 of the elastic buffer module 200. Next, in step S520, the elastic buffer module 200 reads a data sequence D_R from the memory unit 210. In step S530, the elastic buffer module 200 adds auxiliary data to the data sequence D_R to adjust the write state of the transmitting side TX and the read state of the receiving side RX.

Figure 6:
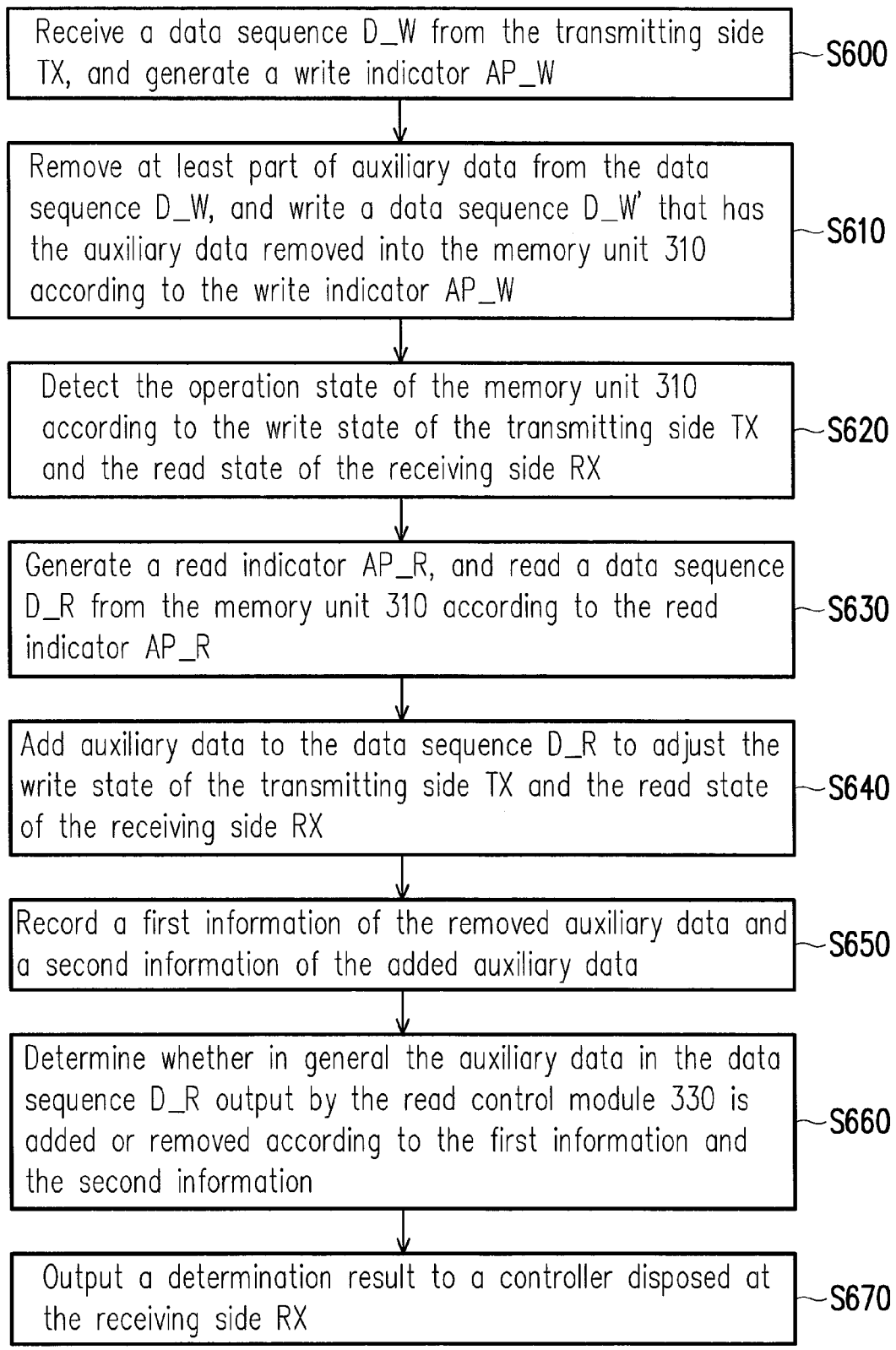
FIG. 6 is a flowchart of an elastic buffering method of a transmission interface according to another embodiment of the invention.

FIG. 6 is a flowchart of an elastic buffering method of a transmission interface according to another embodiment of the invention. Referring to both FIG. 3 and FIG. 6, the elastic buffering method in the present embodiment may be adapted to the elastic buffer module 300 in the embodiment illustrated in FIG. 3 and includes following steps. In step S600, the elastic buffer module 300 receives a data sequence D_W from the transmitting side TX and generates a write indicator AP_W. Then, in step S610, the elastic buffer module 300 removes at least part of auxiliary data from the data sequence D_W and writes a data sequence D_W' that has the auxiliary data removed into the memory unit 310 of the elastic buffer module 300 according to the write indicator AP_W. Meanwhile, in step S620, the elastic buffer module 300 detects whether the operation state of the memory unit 310 is close to an overflow state or an underflow state according to the write state of the transmitting side TX and the read state of the receiving side RX. Next, in step S630, the elastic buffer module 300 generates a read indicator AP_R and reads a data sequence D_R from the memory unit 310 according to the read indicator AP_R. After that, in step S640, the elastic buffer module 300 adds auxiliary data to the data sequence D_R to adjust the write state of the transmitting side TX and the read state of the receiving side RX.

Additionally, to obtain the information about whether in general the auxiliary data in the data sequence D_R is added or removed, in a step S650 in the elastic buffering method provided by the present embodiment, the elastic buffer module 300 records a first information of the removed auxiliary data and a second information of the added auxiliary data. Next, in step S660, the elastic buffer module 300 determines whether in general the auxiliary data in the data sequence D_R output by the read control module 330 is added or removed according to the first information and the second information. Thereafter, in step S670, the elastic buffer module 300 outputs a determination result to the controller disposed at the receiving side RX.

It should be noted that the step S620 and the steps S650-S670 in the present embodiment can be executed any time during the execution of the elastic buffering method, and the sequence of the step S620 and the steps S650-S670 in the present embodiment is only an example but not intended to limit the scope of the invention.

Moreover, the elastic buffering method in the present embodiment can be well understood by referring to the descriptions of the embodiments illustrated in FIGS. 2-4 therefore will not be described herein.

As described above, in an elastic buffer module provided by an exemplary embodiment of the invention, part of the auxiliary data in a data sequence is removed before the data sequence is written into a memory unit. Thereby, a data buffering purpose can be accomplished by using a relatively small buffering space in the memory unit. In addition, because a write control module at the transmitting side continuously removes auxiliary data (equivalent to reducing the write speed of the transmitting side), the transmitting side can have a relatively high operating frequency.

The previously described exemplary embodiments of the present invention have many advantages, including a data buffering purpose accomplished by using a small buffering space, and allowing a large speed difference between a transmitting side and a receiving side, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An elastic buffer module, comprising:
   a memory unit, disposed between a transmitting side and a receiving side, wherein a data sequence is written to the memory unit and the data sequence is received from the transmitting side, stored in the memory unit and outputted by the memory unit in a single read or write process;
   a write control module, coupled to the memory unit, disposed at the transmitting side, and configured to remove at least a part of auxiliary data from the data sequence, and writing the data sequence that has the auxiliary data removed into the memory unit in the signal read or write process; and
   a read control module, coupled to the memory unit and disposed at the receiving side, configured to read the data sequence from the memory unit according to a First-In-First-Out rule, and add auxiliary data to the data sequence in the signal read or write process.

2. The elastic buffer module according to claim 1 further comprising:
a state detection unit, coupled to the write control module, and configured to detect an operation state of the memory unit and output a detection result of the operation state to the read control module, wherein the read control module adds the auxiliary data to the data sequence according to the detection result.

3. The elastic buffer module according to claim 2, wherein the state detection unit is configured to output the detection result to the write control module, and the write control module is configured to remove the auxiliary data from the data sequence according to the detection result.

4. The elastic buffer module according to claim 2, wherein the state detection unit is configured to detect the operation state of the memory unit according to a write state of the transmitting side and a read state of the receiving side.

5. The elastic buffer module according to claim 1, wherein the write control module comprises:
a write indicator generating unit, configured to generate a write indicator, wherein the write indicator is configured to indicate an address in the memory unit for writing the data sequence; and
a write control unit, coupled to the write indicator generating unit, and configured to receive the data sequence, remove the auxiliary data from the data sequence, and write the data sequence that has the auxiliary data removed into the memory unit according to the write indicator.

6. The elastic buffer module according to claim 1, wherein the read control module comprises:
a read indicator generating unit, configured to generate a read indicator, wherein the read indicator is configured to indicate an address in the memory unit for storing the data sequence; and
a read control unit, coupled to the read indicator generating unit, and configured to read the data sequence from the memory unit according to the read indicator, and add the auxiliary data to the data sequence.

7. The elastic buffer module according to claim 1 further comprising:
an auxiliary judgment unit, configured to record a first information of the removed auxiliary data and a second information of the added auxiliary data, determine whether in general auxiliary data in the data sequence output by the read control module is added or removed according to the first information and the second information, and output a judgment result to a controller disposed at the receiving side.

8. The elastic buffer module according to claim 7, wherein the auxiliary judgment unit comprises:
a first counting unit, coupled to the write control module, and configured to counts a first number of the removed auxiliary data;
a second counting unit, coupled to the read control module, and configured to count a second number of the added auxiliary data; and
a complementary detection unit, configured to determine whether in general auxiliary data in the data sequence output by the read control module is added or removed according to the first number and the second number, and output the judgment result to the controller disposed at the receiving side.

9. The elastic buffer module according to claim 1, wherein an auxiliary data is a skip symbol in a skip order set defined by a transmission interface standard.

10. The elastic buffer module according to claim 9, wherein the transmission interface standard is a serial advanced technology attachment (SATA) standard, a peripheral component interconnect (PCI) standard, or a universal serial bus (USB) 3.0 standard.

11. The elastic buffer module according to claim 1, wherein the memory unit remains in a non-overflow state.

12. The elastic buffer module according to claim 1, wherein the read control module is configured to adjust a difference between a write speed of the transmitting side and a read speed of the receiving side to be within an acceptable range by adding the auxiliary data to the data sequence.

13. An elastic buffering method of a transmission interface, wherein the transmission interface is configured to transmit a data sequence from a transmitting side to a receiving side in a single read or write process, the elastic buffering method comprising:
receiving the data sequence from the transmitting side in the single read or write process;
removing at least a part of auxiliary data from the data sequence, and writing the data sequence that has the auxiliary data removed into a memory unit in the single read or write process;
reading the data sequence from the memory unit according to a First-In-First-Out rule in the single read or write process; and
adding auxiliary data to the read data sequence in the single read or write process,
wherein the data sequence is received from the transmitting side, stored in the memory unit, and outputted by the memory unit in the single read or write process.

14. The elastic buffering method according to claim 13 further comprising:
detecting an operation state of the memory unit according to a write state of the transmitting side and a read state of the receiving side, and outputting a detection result.

15. The elastic buffering method according to claim 14, wherein in the step of removing the auxiliary data from the data sequence, the auxiliary data is removed from the data sequence according to the detection result.

16. The elastic buffering method according to claim 14, wherein in the step of adding the auxiliary data to the data sequence, the auxiliary data is added to the data sequence according to the detection result.

17. The elastic buffering method according to claim 13, wherein the step of writing the data sequence that has the auxiliary data removed into the memory unit comprises:
generating a write indicator; and
writing the data sequence that has the auxiliary data removed into the memory unit according to the write indicator,
wherein the write indicator indicates an address in the memory unit for writing the data sequence.

18. The elastic buffering method according to claim 13, wherein the step of reading the data sequence from the memory unit comprises:
generating a read indicator; and
reading the data sequence from the memory unit according to the read indicator,
wherein the read indicator indicates an address in the memory unit for storing the data sequence.

19. The elastic buffering method according to claim 13 further comprising:

recording a first information of the removed auxiliary data and a second information of the added auxiliary data; and determining whether in general auxiliary data in the data sequence output by the read control module is added or removed according to the first information and the second information;

outputting a judgment result to a controller disposed at the receiving side.

20. The elastic buffering method according to claim 19, wherein the step of recording the first information and the second information comprises:

counting a first number of the removed auxiliary data; and
counting a second number of the added auxiliary data.

21. The elastic buffering method according to claim 20, wherein the step of determining whether in general auxiliary data in the data sequence is added or removed comprises:

determining whether in general auxiliary data in the data sequence output by the read control module is added or removed according to the first number and the second number.

22. The elastic buffering method according to claim 13, wherein an auxiliary data is a skip symbol in a skip order set defined by a transmission interface standard.

23. The elastic buffering method according to claim 22, wherein the transmission interface standard is a SATA standard, a PCI express standard, or a USB 3.0 standard.

24. The elastic buffering method according to claim 13, wherein the memory unit remains in a non-overflow state by adjusting a write state and a read state.

25. The elastic buffering method according to claim 13, wherein the step of adding the auxiliary data to the data sequence comprises:

adding the auxiliary data to the data sequence to adjust a difference between a write speed of the transmitting side and a read speed of the receiving side to be within an acceptable range.

* * * * *